April 3, 1956 G. R. ECKSTEIN ET AL 2,740,472
SHEARING MACHINE
Filed Feb. 1, 1952 4 Sheets-Sheet 1

INVENTORS
PHILIP H. BURDETT
GEORGE R. ECKSTEIN
BY
ATTORNEYS

April 3, 1956  G. R. ECKSTEIN ET AL  2,740,472
SHEARING MACHINE
Filed Feb. 1, 1952  4 Sheets-Sheet 3

INVENTORS
PHILIP H. BURDETT
GEORGE R. ECKSTEIN
BY
ATTORNEYS

April 3, 1956 G. R. ECKSTEIN ET AL 2,740,472
SHEARING MACHINE
Filed Feb. 1, 1952 4 Sheets-Sheet 4
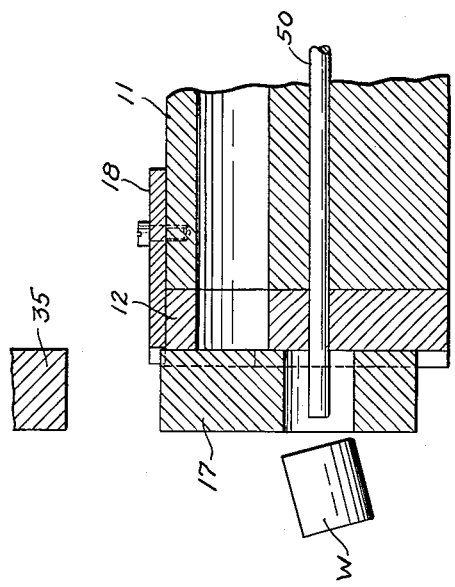
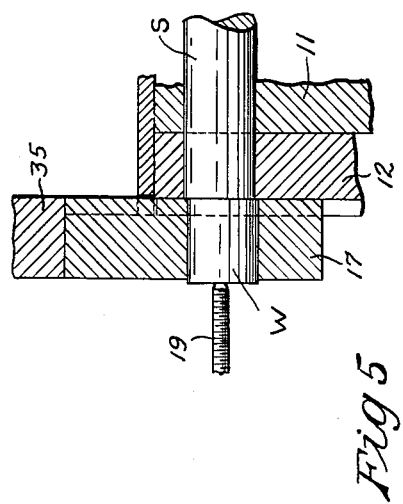
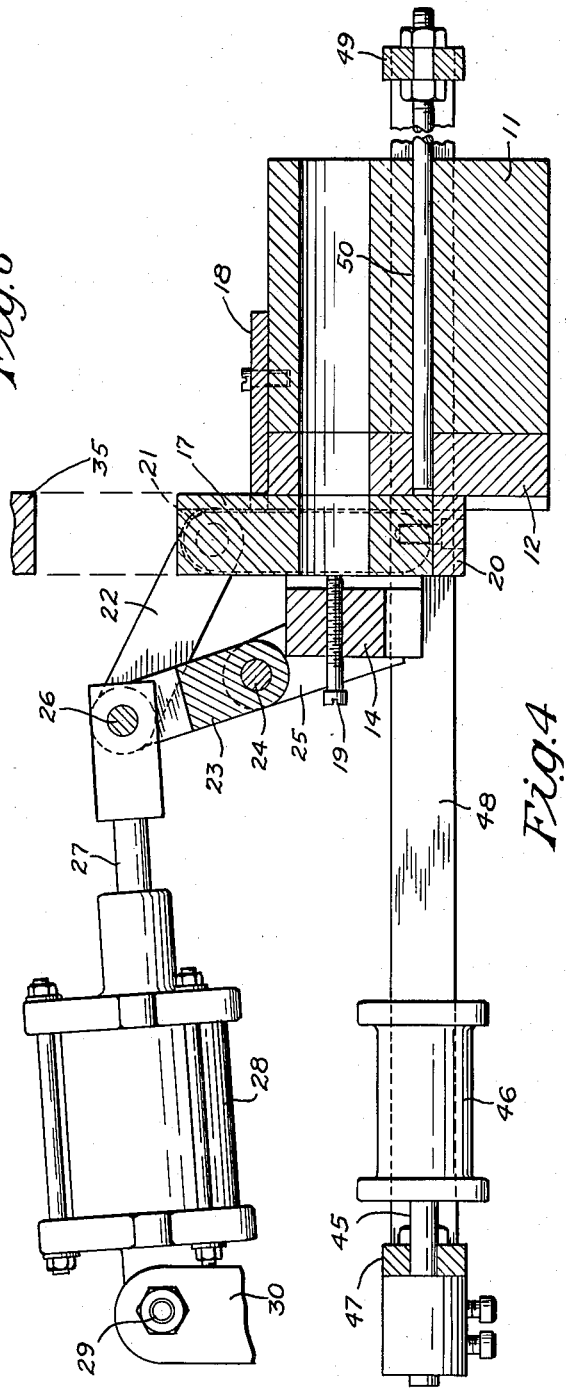
INVENTORS
PHILIP H. BURDETT
GEORGE R. ECKSTEIN
BY
ATTORNEYS United States Patent Office 2,740,472
Patented Apr. 3, 1956

2,740,472

SHEARING MACHINE

George R. Eckstein and Philip H. Burdett, Fairfield, Conn., assignors, by mesne assignments, to the United States of America as represented by the Secretary of the Army Application February 1, 1952, Serial No. 269,418

2 Claims. (Cl. 164—40)

This invention relates to apparatus for the shearing of metal, and contemplates an arrangement of work supporting and shearing devices adapted to sever metal stock in true shear, as distinguished from bending and cutting. The invention further contemplates novel devices for enabling the ejection of a sheared element from the shearing dies.

More specifically, the invention contemplates certain devices adapted to be supported on the fixed platen of a conventional press and to be actuated by the downward movement of the crank operated press platen in such a way that the full power of the press, exerted very close to the end of the downward movement of the platen, is applied to perform the shearing operation and to activate certain devices which thereafter shift the sheared workpiece to position for ejection, and to actuate an ejector.

In the drawings:

Fig. 4 is a section substantially on the line 4—4 of Fig. 1.

Fig. 5 is a fragmentary detailed section on the same line as Fig. 4, showing the shear mechanism in the position it occupies immediately after performing the shearing operation.

Fig. 6 is a fragmentary detailed section similar to Fig. 5, showing the parts in workpiece ejecting position.

Figure 1:
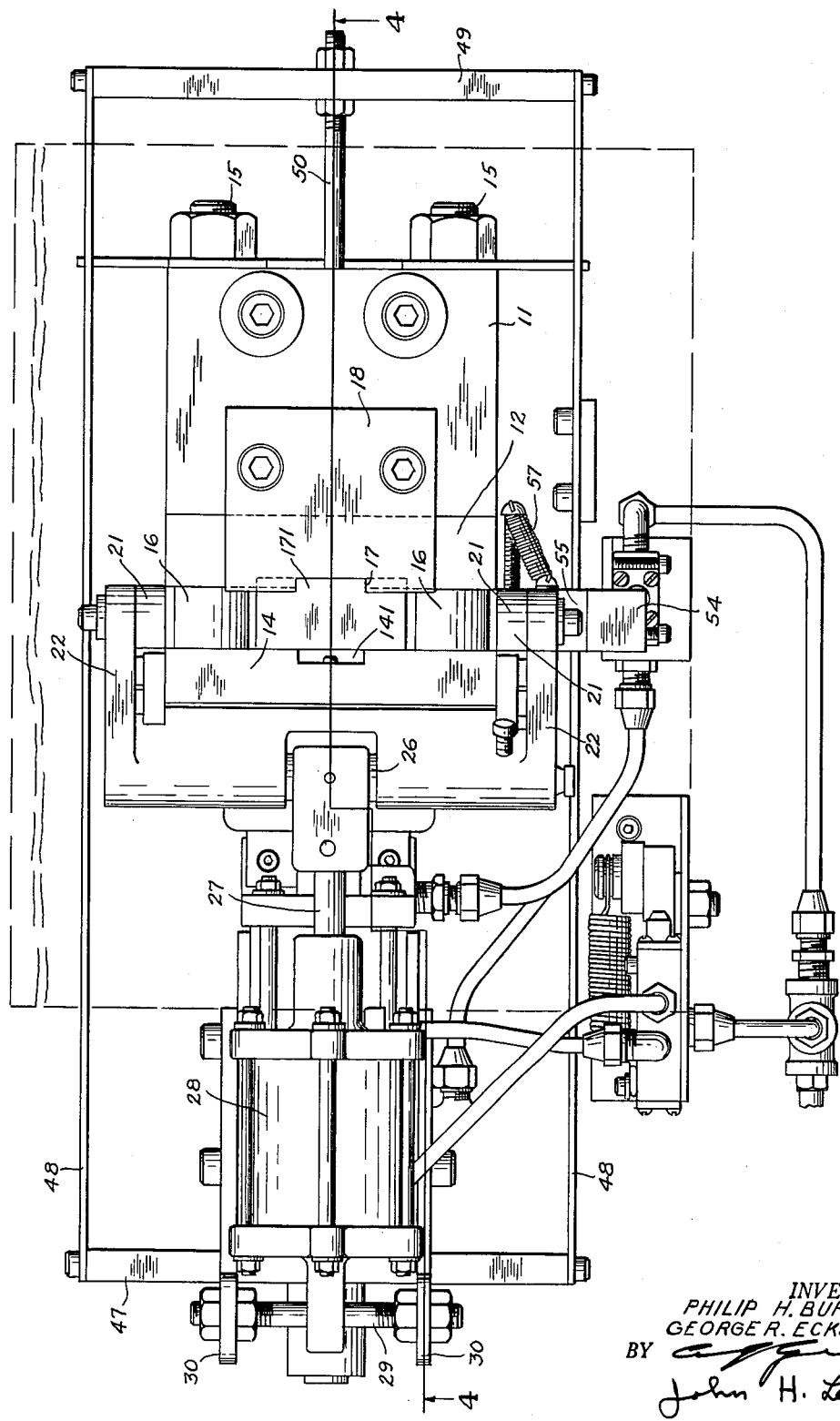
Fig. 1 is a plan view of an apparatus embodying the invention, the movable press gate, which is above the plane of this view, being indicated in a broken line.

Mounted on a base 10, which may be the fixed platen of a press or may be secured to such platen, is a main supporting block 11 which is longitudinally apertured to receive the stock S (Fig. 5) from which a succession of workpieces W are to be sheared. The stock has been illustrated as of circular cross-section, and the aperture through block 11, as well as the aperture through a fixed shear 12 secured to support block 11, is of the same configuration as the stock and of such size that the stock fits closely therein. A minimum of clearance between the periphery of the stock and the periphery of the shearing aperture in the fixed shear 12 is essential to the performance of good work. A guide plate 14 for the movable shear blade is held in proper spaced relation to the fixed shear 12 by suitable means such as assembly bolts 15 passing through aligned apertures in the support block 11, the fixed shear 12, and the shear guide plate 14.

The width of the slot between the fixed shear 12 and the guide plate 14 is determined by collars 16 mounted on the assembly bolts 15 and abutting the adjacent faces of the fixed shear and the shear guide plate respectively. Said collars 16 are of such length as to provide a close but sliding fit between the face of the fixed shear 12 and the adjacent face of a movable shear 17, which shear is guided in its vertical reciprocating movement by engagement in a vertically extending groove formed in the face of the fixed shear 12, this groove being shown in dotted lines in Fig. 1. Corners of the movable shear 17 are cut away at the upper end to define a rib 171 on the movable shear, which rib is engaged in a notch in a cover plate 18 secured to the support block 11. The cover plate 18 thus serves as a stop to define the uppermost position of the movable shear 17. Movable shear 17 is provided with an aperture which, in the work receiving position of said shear, is aligned with the aperture in the fixed shear 12 and, like the aperture in the fixed shear, is of such size as to quite closely engage the work while permitting the work to slide therethrough. The length of the workpiece W to be severed from the stock S in each operation of the machine is accurately determined by suitable means such as an adjustable screw 19 held in a threaded aperture in the shear guide plate 14 in alignment with the work receiving aperture in the fixed shear and support block. Said shear guide plate 14 is vertically slotted, as shown at 141 (Fig. 1) so that the length of the workpieces W can be varied by an amount equal to the depth of said slot 141 by the adjustment of screw 19.

Figure 2:
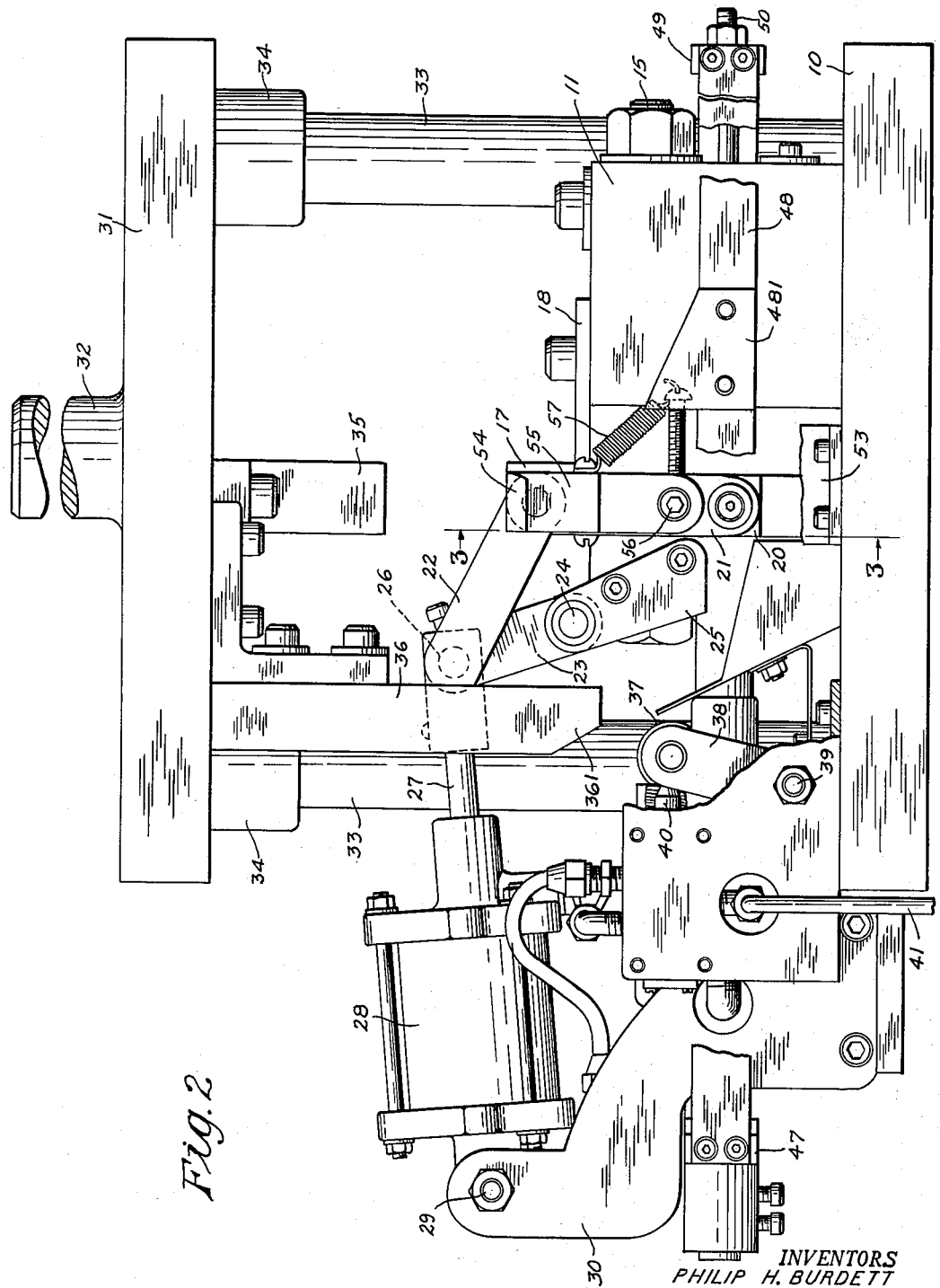
Fig. 2 is a side elevation of apparatus constructed in accordance with the invention, certain parts being broken away for greater clearness.

Power for the very short downward shearing movement of moving shear 17 is derived from the moving gate or platen of the press in which the apparatus is mounted. Said movable platen is identified by numeral 31 (Fig. 2). It is attached to crank-operated mechanism of the press (not shown) by suitable means such as boss 32, and is guided for vertical movement on posts 33 extending upward from base 10 and received in apertures and apertured guide bosses 34 through and secured to platen 31. Extending downwardly from platen 31 is a power transmitting post or lug 35 adapted to engage the upper end of movable shear 17 to displace said movable shear downwardly a short distance. In normal position, the upper end of movable shear 17 is spaced from the lower end of lug 35, as clearly shown in Figs. 2 and 4, the gap between the two representing a major portion of the press stroke. It is only when platen 31 is very close to its lowermost position that lug 35 engages movable shear 17 and very forcibly thrusts it downwardly. The platen 31 being crank operated in a conventional manner, the shearing movement is thus imparted to movable shear 17 at a time when the press is exerting its maximum power through a very short distance. By reason of this fact and the close fit and support of the work in both movable shear 17 and fixed shear 12 and the close fit at the juxtaposed faces of fixed and movable shears, a true shearing action, as distinguished from a cutting action, is secured. It has been found, for example, that a 75S aluminum rod 1 1/16" in diameter is cleanly sheared by a 1/16" shearing movement of movable shear 17 when actuated in the manner described by a 50-ton press. The stock being peripherally supported in fixed and movable shears respectively over a length comparable with its vertical dimension, the workpiece is severed from the stock without appreciable distortion of either. The shear surface is an undistorted plane perpendicular to the length of the stock and shows over substantially its entire area the finely granular structure of the stock, as distinguished from the distorted and lustrous surface characteristic of a cutting operation. The stock is not cut by a knife edge, as it is in conventionally so-called "shearing" operations, but is actually severed under a shear stress. The relative positions of the shearing elements at the instant the shearing operation is completed are shown in Fig. 5—the platen 31 and power transmitting lug 35 carried thereon have reached their lowermost positions with a very short (not over 1/16") downward displacement of the movable shear.

Figure 3:
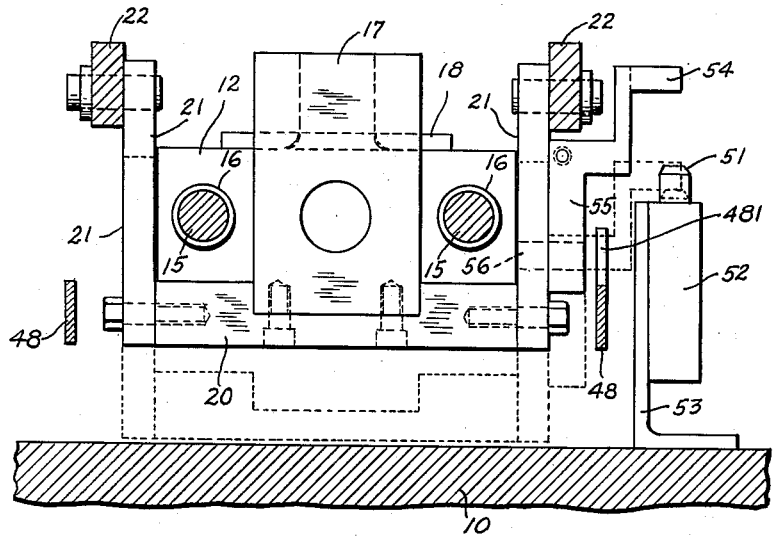
Fig. 3 is a transverse section substantially on the line 3—3 of Fig. 2.
Figure 7:
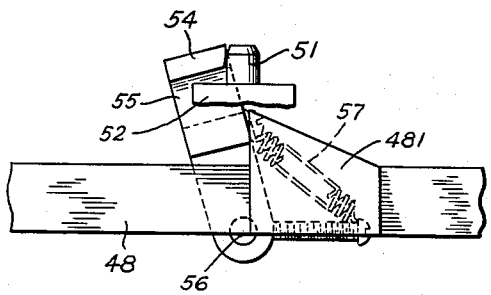
Fig. 7 is a fragmentary elevation, showing the release of the ejector actuator valve plunger by an abutment on the ejector frame.

The workpiece W having been sheared from the stock S, it is necessary to effect a further downward displacement of the movable shear 17 (Fig. 6), to permit ejection of the workpiece therefrom. The devices for this purpose may be constructed as follows:

To the bottom of said movable shear 17 is secured a transverse bar 20 and at each end of bar 20 is pivoted a link 21, the upper ends of links 21 being pivotally joined to arms 22 of an elbow-shaped member comprising a portion 23 pivoted at 24 to a bracket 25 secured to the shear guide plate 14. Pivoted at 26 to the elbow member 22—23 is a piston rod 27 projecting from a fluid cylinder 28 which is pivotally mounted at 29 in brackets 30 extending upwardly and outwardly from base 10. Admission of fluid to cylinder 28, to project piston rod 27 therefrom and thrust movable shear 17 downwardly, from the Fig. 5 position to the Fig. 6 position, is controlled by a stem 36 extending downwardly from movable platen 31. Said stem 36 is provided with a cam surface 361 adapted to engage a roller 37 mounted in an arm 38 pivoted at 39 and engaging a plunger 40 controlling a valve which admits fluid, from a fluid supply, indicated at 41, to the left end of cylinder 28. This action takes place in the downward movement of platen 31 before the power transmitting lug 35 has engaged the upper end of movable shear 17, with the result that as soon as the workpiece is sheared from the stock in the manner above described the shear is moved downwardly by piston rod 27 and connections therefrom from the Fig. 5 position to the Fig. 6 position. This movement controls a fluid-operated ejector device which may be constructed as follows:

A piston rod 45 projecting from a cylinder 46 supported from the base 10 is connected to a frame comprising a transversely extending bar 47 adjacent the cylinder, side bars 48 extending the entire length of the machine, a transversely extending plate 49 at the opposite end of the machine, and an ejector rod 50 secured to the bar 49. Ejector rod 50 extends through aligned apertures in support block 11 and fixed shear 12. The admission of fluid to cylinder 46, to effect the movement of ejector rod 50 from its Fig. 4 position to its Fig. 6 position, is controlled by plunger 51 of a valve 52 held on a bracket 53 secured to base 10. Said plunger is engaged and depressed near the end of the downward movement of movable shear 17 by the horizontally extending portion 54 of a lever 55 pivoted at 56 to one of the aforementioned links 21 which, it will be remembered, effect the downward movement of movable shear 17. Thus, as the movable shear approaches its Fig. 6 position, shown also on Fig. 3 in broken lines, the ejector rod is thrust to the left, ejecting the workpiece from the movable shear. Since the movable shear almost immediately starts its upward movement, it is necessary to promptly displace the ejector rod 50 to normal position. To this end, an abutment 481 is secured to the bar 48 which is adjacent the lever 55 and, in the leftward (Fig. 2) movement of said arm 48, laterally engages lever 55, rocking said lever about its pivot 56 against the tension of a spring 57 which tends to hold said lever in normal position, and releasing plunger 51. Upon such release of plunger 51, fluid is admitted to the right end of cylinder 46 and the ejector mechanism is restored to its normal (Fig. 4) position. Thereafter, the upward movement of stem 36 with platen 31 releases roller 37 and plunger 40, admitting fluid to the right end of cylinder 28 and restoring the shear mechanism to the Fig. 4 position.

It will be obvious that, without departing from the spirit of the invention, many alterations and variations can be made in the illustrative structures which have been described.

What is claimed is:

1. Apparatus for shearing metal bar stock comprising a shearing mechanism and a work ejecting mechanism, said shearing mechanism comprising an apertured fixed shear and an apertured movable shear, the apertures whereof are of approximately the same size and configuration as the stock, a movable platen provided with a lug adapted to engage said movable shear, said platen and lug moving with a reciprocating stroke, said lug engaging said movable shear for a short portion of the stroke, a fluid operated pressure cylinder actuated by a fluid admitting valve, a stem affixed to said movable platen, said stem engaging a valve operating means prior to the engagement of said lug with said movable shear whereby said valve is opened and fluid admitted to said cylinder, said cylinder being connected to said movable shear and exerting upon said shear a force following the shearing action to further advance said movable shear in the direction of stroke, whereby upon release of the shearing forces said movable shear is advanced in a direction away from shearing position.

2. Apparatus for shearing metal bar stock comprising a shearing mechanism and a work ejecting mechanism, said shearing mechanism comprising an apertured fixed shear and an apertured movable shear, the apertures whereof are of approximately the same size and configuration as the stock, a movable platen provided with a lug adapted to engage said movable shear, said platen and lug moving with a reciprocating stroke, said lug engaging said movable shear for a short portion of the stroke, a fluid operated pressure cylinder actuated by a fluid admitting valve, a stem affixed to said movable platen, said stem engaging a valve operating means prior to the engagement of said lug with said movable shear whereby said valve is opened and fluid admitted to said cylinder, said cylinder being connected to said movable shear and exerting upon said shear a force following the shearing action to further advance said movable shear in the direction of stroke, whereby upon release of the shearing forces said movable shear is advanced in a direction away from shearing position, a second fluid operated cylinder having a piston rod extending therefrom and being connected to an ejector rod extending through a second aperture in said fixed shear, a valve for admitting fluid under pressure to said second cylinder, said valve being engaged by means operated by said movable shear near the end of said advanced movement thereof and when said aperture in said movable shear is in alignment with said second aperture in said fixed shear whereby said ejector rod engages the severed workpiece and ejects same prior to the return of said movable shear to shearing position.

References Cited in the file of this patent

UNITED STATES PATENTS

| | | |
|---|---|---|
| 771,752 | Stafford | Oct. 4, 1904 |
| 1,007,792 | Orton | Nov. 7, 1911 |
| 1,901,067 | Vickers | Mar. 14, 1933 |
| 2,041,530 | DeWitt | May 19, 1936 |
| 2,249,149 | MacMillin | July 15, 1941 |
| 2,343,073 | Morin | Feb. 29, 1944 |
| 2,378,777 | Lehmeier | June 19, 1945 |
| 2,401,800 | Ryan | June 11, 1946 |
| 2,405,949 | Grise | Aug. 20, 1946 |
| 2,413,638 | MacBlane | Dec. 31, 1946 |

FOREIGN PATENTS

| | | |
|---|---|---|
| 897,332 | France | May 22, 1944 |